United States Patent
Satomi

Patent Number: 5,315,192
Date of Patent: May 24, 1994

[54] THREE-PHASE HYBRID TYPE STEPPING MOTOR

[75] Inventor: Hirobumi Satomi, Chiba, Japan

[73] Assignee: Oriental Motor Kabushiki Kaisha, Tokyo, Japan

[21] Appl. No.: 21,149

[22] Filed: Feb. 23, 1993

[30] Foreign Application Priority Data

Feb. 27, 1992 [JP] Japan ................. 4-076007

[51] Int. Cl.$^5$ ............................ H02K 37/02
[52] U.S. Cl. ............................. 310/49 R
[58] Field of Search ..................... 310/49 R

[56] References Cited

U.S. PATENT DOCUMENTS

| | | | |
|---|---|---|---|
| 4,385,247 | 5/1983 | Satomi | 310/49 R |
| 4,595,871 | 6/1986 | Koehler | 318/696 |

*Primary Examiner*—Steven L. Stephan
*Assistant Examiner*—Judson H. Jones
*Attorney, Agent, or Firm*—McAulay Fisher Nissen Goldberg & Kiel

[57] ABSTRACT

A three-phase hybrid type stepping motor includes a stator having 12 salient poles $1_1, 1_2, 1_3, \ldots, 1_{11}, 1_{12}$. The stator salient poles having the number a of stator teeth 3 and those having the number (a+1) of stator teeth are disposed alternately and a pitch $\tau_{s1}$ of the number a of stator teeth and a pitch $\tau_{s2}$ of the number (a+1) of stator teeth satisfy the relation of $\tau_{s1} \geq \tau_{s2}$. A pitch angle formed by central lines of the salient poles and the stator teeth disposed in the salient poles is an equal pitch of 30 degrees and the number $Z_R$ of rotor teeth being given by $Z_R = 12n \pm 2$ or $Z_R = 12n \pm 4$ (where the numbers a and n are integers equal to or larger than 1). The three-phase stepping motor has excellent characteristics in vibration, resolution and high-speed operation as compared with a two-phase stepping motor and its driving circuit can be made simple and low-cost in manufacturing.

2 Claims, 6 Drawing Sheets

$a = 3, n = 4, Z = 12n + 2 = 50°$
$\tau_{s1} = 7.2°, \tau_{s2} = 6.9°$ $a = 3, n = 4, Z = 12n + 2 = 50°$
$\tau_{s1} = 7.2°, \tau_{s2} = 6.9°$ $a = 7$, $n = 8$  $Z_R = 12n + 4 = 100$
$\tau_{S1} = 3.6°$, $\tau_{S2} = 3.6°$

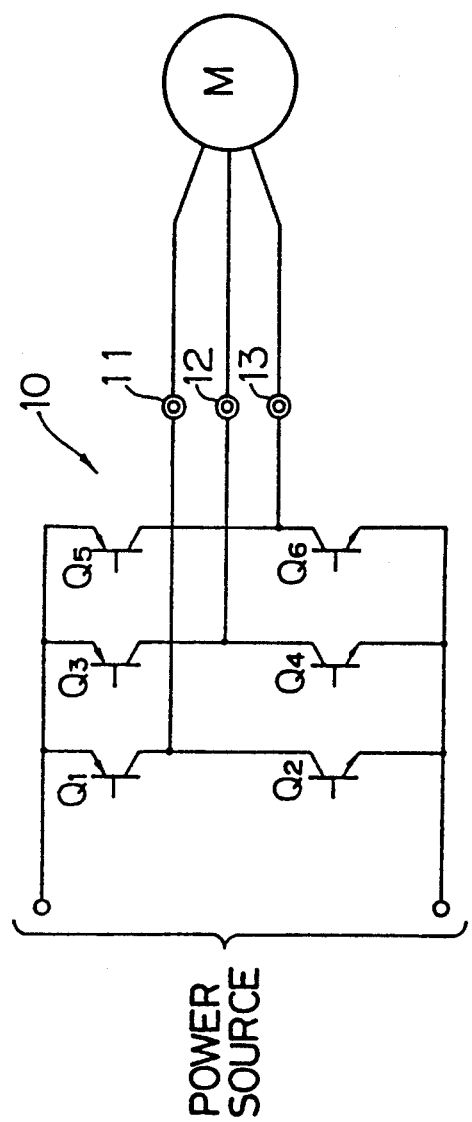

THREE-PHASE HYBRID TYPE STEPPING MOTOR

FIELD OF THE INVENTION AND RELATED ART STATEMENT

The present invention relates to a three-phase hybrid type stepping motor having 12 salient poles formed in a stator.

Heretofore, an iron core of a stator for the hybrid type stepping motor having sections as shown in FIGS. 8 and 9 is well known. The iron core shown in FIG. 8 is designed for two phases and the iron core shown in FIG. 9 for five phases.

The two-phase stepping motor has a long history and is most general but has a problem such as vibration or sympathetic vibration. Accordingly, there are circumstances that a five-phase stepping motor has been developed as an excellent motor having lower vibration, high resolution and high speed characteristics.

However, the five-phase stepping motor requires at least 10 switching elements necessary for bipolar driving it. The number of switching elements is larger as compared with 8 elements in the two-phase stepping motor. Accordingly, there is a problem that a driving circuit for the five-phase stepping motor is complicated and a manufacturing cost thereof is high.

OBJECT AND SUMMARY OF THE INVENTION

The present invention has been made in view of the above problem and an object of the present invention is to provide a three-phase hybrid type stepping motor having more excellent characteristics in vibration, resolution and high-speed operation than a two-phase stepping motor and having a simple driving circuit and low manufacturing cost.

In order to achieve the object, according to the present invention, the three-phase hybrid type stepping motor including a stator having 12 salient poles disposed radially and a plurality of stator teeth disposed in a surface of each of the salient poles opposite to a rotor is characterized in that:

the salient poles of the stator having the number a of stator teeth and those having the number (a+1) of stator teeth are disposed alternately, and a tooth pitch $\tau_{s1}$ of the number a of stator teeth and a tooth pitch $\tau_{s2}$ of the number (a+1) of stator teeth satisfy the following relation:

$$\tau_{s1} \geqq \tau_{s2}$$

a pitch angle formed by central lines of the salient poles and the stator teeth disposed in the salient poles being an equal pitch of 30 degrees, the number $Z_R$ of rotor teeth being given by $$Z_R = 12n \pm 2 \text{ or } Z_R = 12n \pm 4$$

where the numbers a and n are integers equal to or larger than 1.

Further, the stator is characterized by the provision of iron plates forming an iron core of the stator and being successively shifted by 60° to be laminated.

The hybrid type stepping motor of the present invention is configured as above and accordingly complete three-phase windings can be wound on the stator.

When the three-phase hybrid type stepping motor of the present invention is configured in accordance with the number $Z_R$ of rotor teeth defined by the above equation $Z_R = 12n \pm 2$, the connection system of phase windings of the stator can be configured with 4 pairs of poles for each phase, that is, 8 poles as shown in FIG. 2.

Accordingly, the three-phase motor having 12 salient poles can shorten a magnetic path of the stator as compared with a conventional system having two pairs of poles for each phase, that is, 4 poles. Consequently, since a magnetic flux density of a yoke can be lowered, iron loss can be reduced to about half as compared with the conventional system. This means that the high-speed characteristic can be improved greatly.

As apparent from the above description, according to the three-phase hybrid type stepping motor of the present invention, since the 12 stator salient poles, the number of the stator teeth disposed in the salient poles alternately, the pitch angle formed by the central lines of the stator teeth and the number of the rotor teeth are configured to satisfy the predetermined relation, complete three-phase windings can be wound on the iron core of the stator.

Accordingly, the three-phase hybrid type stepping motor of the present invention has excellent characteristics in vibration, resolution and high-speed operation as compared with the two-phase stepping motor and can attain simplification of a driving circuit thereof and reduction of a manufacturing cost as compared with the five-phase stepping motor.

BRIEF DESCRIPTION OF THE DRAWINGS

FIG. 6 is an internal connection diagram of a three-phase hybrid type stepping motor of the present invention, in which

FIG. 7 is a driving circuit diagram of a three-phase hybrid type stepping motor of the present invention;

DETAILED DESCRIPTION OF PREFERRED EMBODIMENTS

Preferred embodiments of the present invention are now described in detail with reference to the accompanying drawings.

FIRST EMBODIMENT

Figure 1:
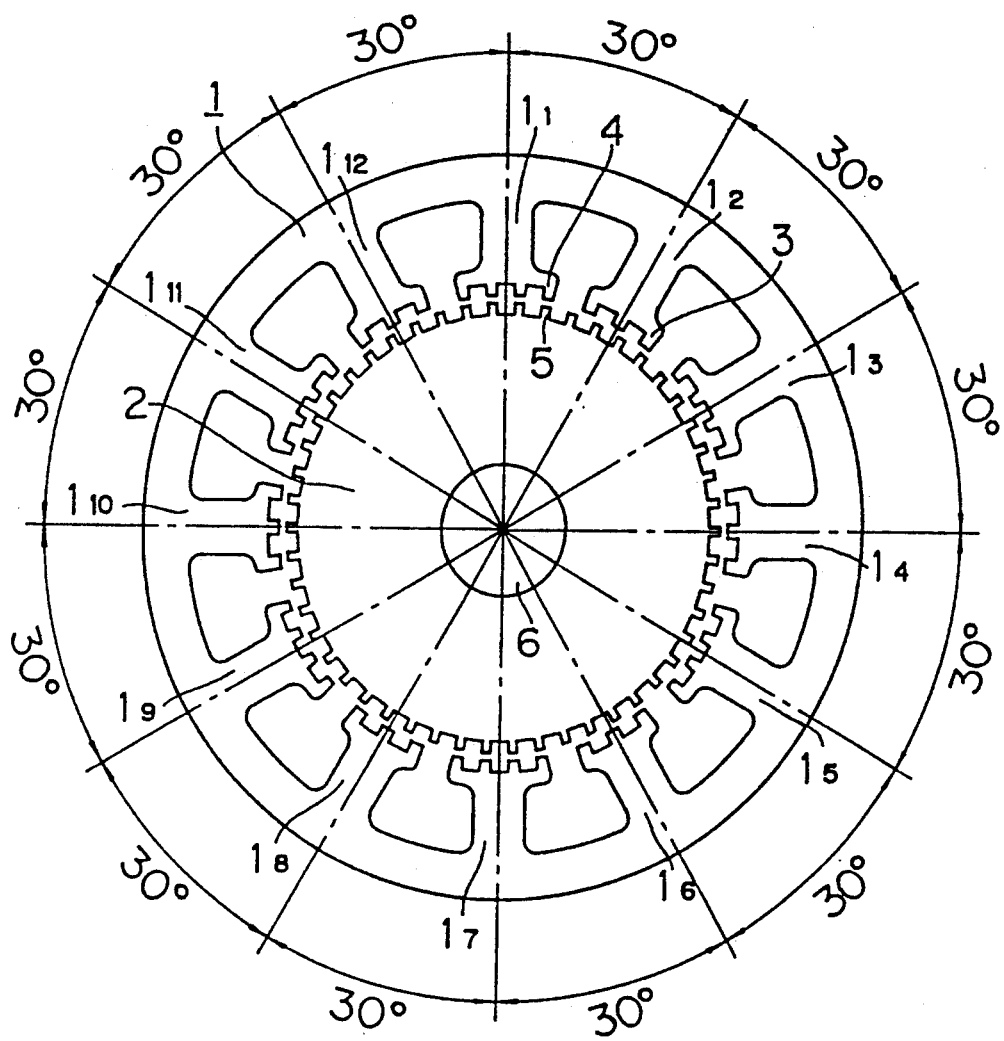
FIG. 1 is a sectional view of an iron core of a stator showing a first embodiment of a three-phase hybrid type stepping motor according to the present invention.
Figure 2:
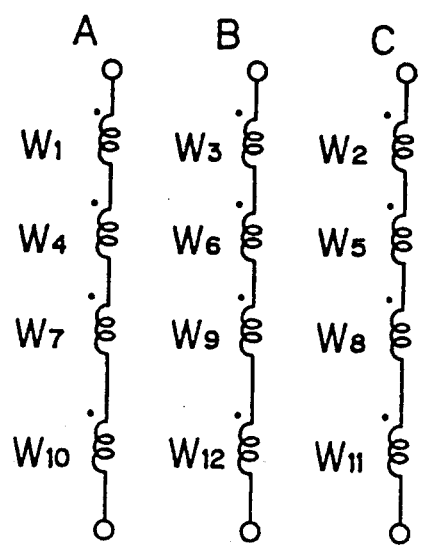
FIG. 2 is a connection diagram of phase windings which are wound on the iron core of the stator of FIG. 1 in three-phase configuration.
Figure 3:
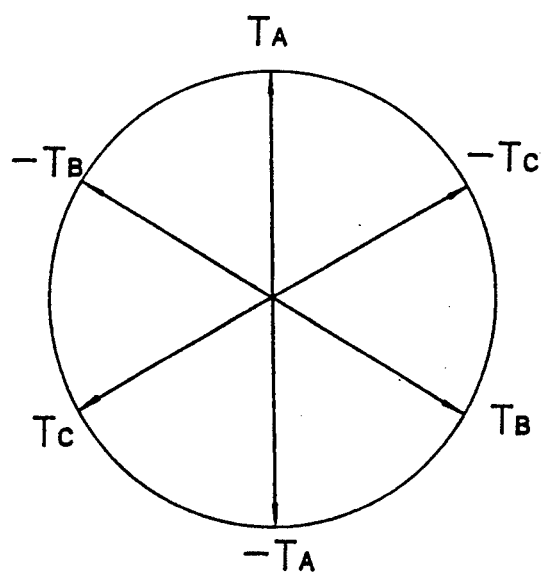
FIG. 3 is a torque vector diagram in case where the three-phase windings are provided on the stator iron core of FIG. 1.

FIGS. 1 to 3 show a first embodiment of a three-phase hybrid type stepping motor of the present invention.

FIG. 1 is a sectional view of an iron core of a stator of the stepping motor which shows a mutual relation of the stator iron core to an iron core of a rotor.

The stepping motor of FIG. 1 includes a stator iron core 1 and a rotor iron core 2. 12 stator salient poles $1_1$, $1_2$, $1_3$, ..., $1_{11}$, $1_{12}$ disposed radially in the stator iron core 1 are formed with the number a (where a is an integer equal to or larger than 1) of stator teeth 3 formed at a tooth pitch $\tau_{s1}$ or at intervals of $\tau_{s1}$ and the number (a+1) of stator teeth 4 formed at a tooth pitch $\tau_{s2}$ (where $\tau_{s1} \geq \tau_{s2}$), the teeth 3 and 4 being disposed alternately and opposite to the rotor iron core 2.

Central lines of the stator teeth 3 and 4 formed in the salient poles $1_1$, $1_2$, $1_3$, ..., $1_{11}$, $1_{12}$ are disposed at equal intervals of 30 degrees.

On the other hand, a multiplicity of rotor teeth 5 are formed in an outer periphery of the iron core 2 of the rotor and mechanical torque is produced from an output shaft 6 disposed through the iron core 2 of the rotor at a predetermined step angle.

FIG. 1 shows the iron cores of the stepping motor having the numbers a=3 and n=4, the number of rotor teeth $Z_R = 12n+2 = 50$, the pitches of teeth $\tau_{s1} = 7.2°$ and $\tau_{s2} = 6.9°$. That is, four stator teeth 4 are formed at the tooth pitch of 6.9° in the salient poles $1_1$, $1_3$, $1_5$, $1_7$, $1_9$ and $1_{11}$ and three stator teeth 3 are formed at the tooth pitch = 7.2° in the salient poles $1_2$, $1_4$, $1_6$, $1_8$, $1_{10}$ and $1_{12}$.

Deviation angles of the stator teeth 3, 4 formed in the inner periphery of the salient poles $1_1$, $1_2$, $1_3$, ..., $1_{11}$, $1_{12}$ and the rotor teeth 5 formed in the outer periphery of the rotor iron core 2 in the state (that is, the number of rotor teeth $Z_R = 12n \pm 2$) of FIG. 1 are (0/6) $\tau_R$, (4/6) $\tau_R$, (2/6) $\tau_R$, (0/6) $\tau_R$, (4/6) $\tau_R$, (2/6) $\tau_R$, (0/6) $\tau_R$, (4/6) $\tau_R$, (2/6) $\tau_R$, (0/6) $\tau_R$, (4/6) $\tau_R$ and (2/6) $\tau_R$ with the rotor teeth pitch $\tau_R$ as a unit.

Accordingly, as shown in FIG. 2, windings $W_1$, $W_4$, $W_7$ and $W_{10}$ wound on the salient poles $1_1$, $1_4$, $1_7$ and $1_{10}$ are connected to the same polarity to be set as an A phase, and windings $W_3$, $W_6$, $W_9$ and $W_{12}$ wound on the salient poles $1_3$, $1_6$, $1_9$ and $1_{12}$ are connected to the same polarity similarly to the A phase to be set as a B phase.

Further, when it is assumed that windings $W_2$, $W_5$, $W_8$ and $W_{11}$ wound on the remaining salient poles $1_2$, $1_5$, $1_8$ and $1_{11}$ are connected to the same polarity similarly to be set as a C phase, torque vectors $T_A$, $T_B$ and $T_C$ produced when currents flow through the A, B and C phase windings from the top to the bottom thereof in FIG. 2 have a phase angle of 120° in the electric angel from the relation of the deviation angle as shown in FIG. 3.

Torque vectors produced when current flow through the A, B and C phase windings from the bottom to the top thereof in FIG. 2 are $-T_A$, $-T_B$ and $-T_C$ and accordingly the torque vectors $T_A$, $-T_C$, $T_B$, $-T_A$, $T_C$, $-T_B$ rotated in a predetermined direction by 60° in the electric angle can be produced.

A basic step angle $\theta_s$ is equal to $60/50=1.2°$ ($\theta_s = 60/50 = 1.2°$) from the torque vector phase angle (electric angle)/number of rotor teeth and the three-phase hybrid type stepping motor having the step angle of 1.2° can be configured.

In the embodiment, if the tooth pitch of the four stator teeth 4 formed in the salient poles $1_1$, $1_3$, $1_5$, ... is set to 6.9° to form a vernier pitch narrower than the tooth pitch of 7.2° of the rotor teeth 5 and the tooth pitch of three stator teeth 3 formed in the other salient poles $1_2$, $1_4$, $1_6$, ... is 7.2° as equal as the tooth pitch of the rotor teeth 5, a difference in magnitude of the torque produced per salient pole depending on the number of stator teeth can be reduced.

SECOND EMBODIMENT

Figure 4:
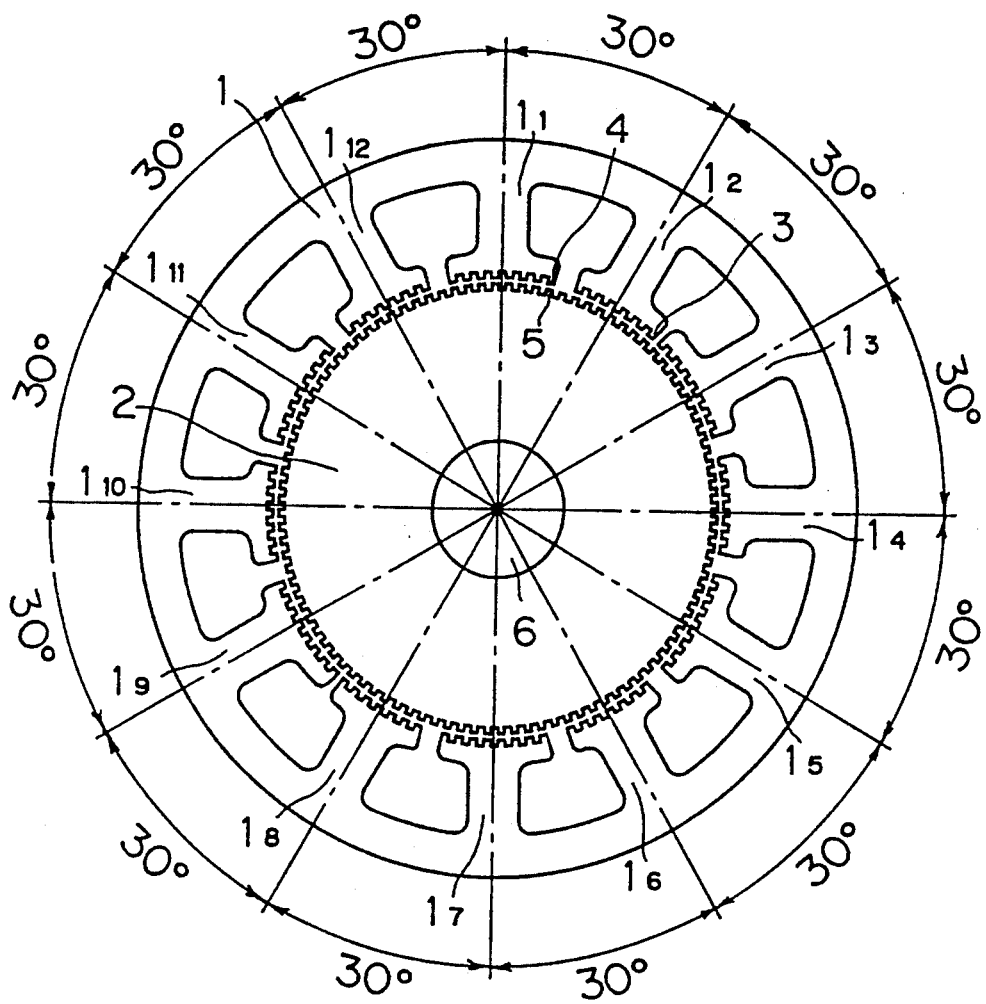
FIG. 4 is a sectional diagram of an iron core of a stator showing a second embodiment of the present invention.
Figure 5:
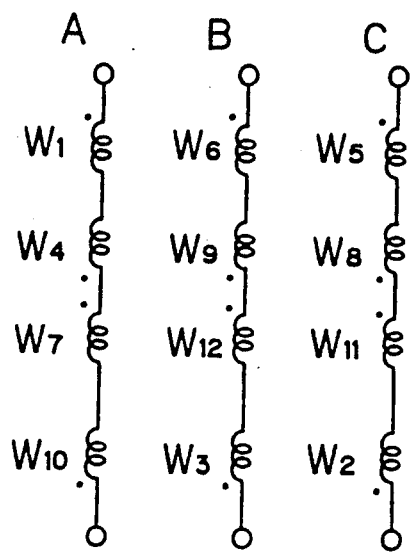
FIG. 5 is a connection diagram of phase windings which are wound on the stator iron core of FIG. 4 in three-phase configuration.

FIGS. 4 and 5 show a second embodiment of a three-phase hybrid type stepping motor of the present invention.

FIG. 4 is a sectional view of an iron core of the stator of the stepping motor and shows a mutual relation of the stator iron core to an iron core of the rotor. In FIG. 4, the same members as those of FIG. 1 are designated by the same reference numerals and description thereof is omitted.

FIG. 4 shows the iron cores of the stepping motor having the numbers a=7 and n=8, the number of rotor teeth $Z_R = 12n+4 = 100$, the pitches of teeth $\tau_{s1} = \tau_{s2} = 3.6°$.

Deviation angles of the stator teeth 3, 4 formed in the inner periphery of the salient poles $1_1$, $1_2$, $1_3$, ..., $1_{11}$, $1_{12}$ and the rotor teeth 5 formed in the outer periphery of the rotor 2 in the state (that is, the number of rotor teeth $Z_R = 12n \pm 4$) of FIG. 4 are (0/6) $\tau_R$, (5/6) $\tau_R$, (4/6) $\tau_R$, (3/6) $\tau_R$, (2/6) $\tau_R$, (1/6) $\tau_R$, (0/6) $\tau_R$, (5/6) $\tau_R$, (4/6) $\tau_R$, (3/6) $\tau_R$, (2/6) $\tau_R$, and (1/6) $\tau_R$ with the rotor teeth pitch $\tau_R$ as a unit.

Accordingly, as shown in FIG. 5, A, B and C phase windings are connected to different poles from one another in each phase.

The basic step angle $\theta_s$ in this case is equal to $60/100 = 0.6°$ ($\theta_s = 60/100 = 0.6°$) and the three phase hybrid type stepping motor having the step angle of 0.6° can be configured.

According to the first and second embodiments, the stator iron core 1 has six axes of line symmetry shifted by 30° and since iron plates forming the iron core are successively rotated by 60° to be laminated, the stator iron core can attain magnetic and mechanical uniformity.

Figure 6A:
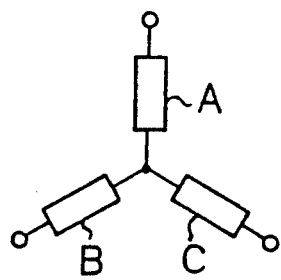
FIG. 6(A) is a star connection diagram and FIG. 6(B) is a delta connection diagram.
Figure 6B:
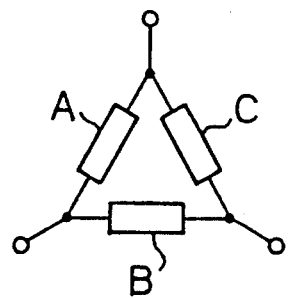
Figure 8:
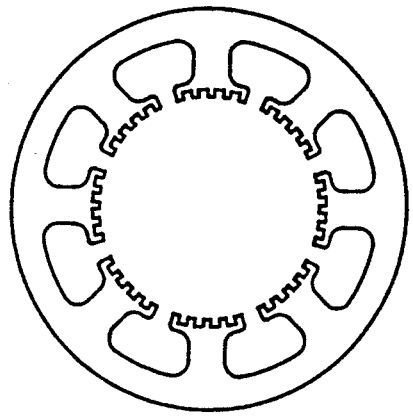
FIG. 8 is a sectional diagram of a stator iron core designed for a conventional two-phase hybrid type stepping motor.
Figure 9:
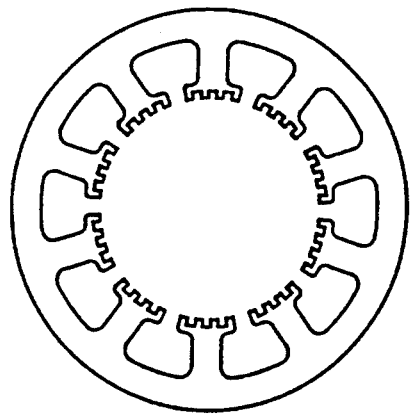
FIG. 9 is a sectional view of a stator iron core designed for a conventional five-phase hybrid type stepping motor.

Further, the three phase windings A, B and C are star-connected as shown in FIG. 6(A) or delta-connected as shown in FIG. 6(B), so that the number of switching elements $Q_1$, $Q_2$ ... $Q_6$ of an output stage of a driving circuit 10 can be reduced to 6 as shown in FIG. 7.

At the same time, since the number of motor connection terminal 11, 12 and 13 of the driving circuit 10 is also reduced to 3, the driving circuit 10 can be made compact and low-cost.

Since the number of lead wires from the three-phase stepping motor M is also 3, the cost of the motor M can be reduced and the connection operation of wires to the driving circuit 10 can be also made easy.

The technique of the present invention is not limited to that of the embodiments and the present invention can be attained by other means performing the similar function. Further, various modifications and additions can be made to the technique of the present invention without departing from the scope of the present invention.

I claim:

1. A three-phase hybrid type stepping motor including a stator having 12 salient poles disposed radially and a plurality of stator teeth disposed in a surface of each of said salient poles opposite to a rotor characterized in that:

said salient poles of said stator having the number a of stator teeth and those having the number (a+1) of stator teeth are disposed alternately, and a tooth pitch $\tau_{s1}$ of the number a of stator teeth and a tooth pitch $\tau_{s2}$ of the number (a+1) of stator teeth satisfy the following relation:

$$\tau_{s1} \geqq \tau_{s2}$$

a pitch angle formed by central lines of said salient poles and said stator teeth disposed in said salient poles being an equal pitch of 30 degrees, the number $Z_R$ of rotor teeth being given by $$Z_R = 12n \pm 2 \text{ or } Z_R = 12n \pm 4$$

where the numbers a and n are integers equal to or larger than 1.

2. A three-phase hybrid type stepping motor according to claim 1, wherein said stator includes iron plates forming said stator iron core and being successively shifted by 60 degrees to be laminated.

* * * * *